US011665117B2

(12) United States Patent
Gilbert

(10) Patent No.: US 11,665,117 B2
(45) Date of Patent: *May 30, 2023

(54) SERVICE PLATFORM TO SUPPORT AUTOMATED CHAT COMMUNICATIONS AND METHODS FOR USE THEREWITH

(71) Applicant: AT&T Intellectual Property I, L.P., Atlanta, GA (US)

(72) Inventor: Mazin E. Gilbert, Warren, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 198 days.

This patent is subject to a terminal disclaimer.

(21) Appl. No.: 17/068,772

(22) Filed: Oct. 12, 2020

(65) Prior Publication Data

US 2021/0029066 A1    Jan. 28, 2021

Related U.S. Application Data

(63) Continuation of application No. 14/801,609, filed on Jul. 16, 2015, now Pat. No. 10,805,244.

(51) Int. Cl.
| | |
|---|---|
| *H04L 51/046* | (2022.01) |
| *G06Q 30/00* | (2023.01) |
| *G06F 16/245* | (2019.01) |
| *G06F 16/2458* | (2019.01) |
| *H04L 51/04* | (2022.01) |
| *G06F 16/33* | (2019.01) |
| *H04L 51/216* | (2022.01) |
| *H04L 67/50* | (2022.01) |
| *G06Q 30/016* | (2023.01) |

(52) U.S. Cl.
CPC .......... *H04L 51/046* (2013.01); *G06F 16/245* (2019.01); *G06F 16/2465* (2019.01); *G06F 16/334* (2019.01); *G06Q 30/016* (2013.01); *H04L 51/04* (2013.01); *H04L 51/216* (2022.05); *H04L 67/535* (2022.05)

(58) Field of Classification Search
CPC ....... H04L 51/046; H04L 51/04; H04L 51/16; H04L 67/22; G06F 17/30539; G06F 17/30424; G06Q 30/016
See application file for complete search history.

(56) References Cited

U.S. PATENT DOCUMENTS

| | | |
|---|---|---|
| 6,377,944 B1 | 4/2002 | Busey et al. |
| 7,103,171 B1 | 9/2006 | Annadata et al. |
| 7,734,699 B2 | 6/2010 | Bhatnagar |
| 8,566,135 B2 | 10/2013 | Kannan et al. |
| 8,595,174 B2 | 11/2013 | Gao et al. |
| 8,805,822 B2 | 8/2014 | Jaffer et al. |
| 8,819,013 B2 | 8/2014 | Buryak et al. |

(Continued)

OTHER PUBLICATIONS

Kim, et al., "Classifying dialogue acts in multi-party live chats," 26th Pacific Asia Conference on Language, Information and Computation. 2012.

*Primary Examiner* — Scott B Christensen

(57) ABSTRACT

Aspects of the subject disclosure may include, for example, a service platform that receives a chat request from a client device associated with a user. A chat database of previous chat sessions associated with other users is searched based on the chat request to identify a previous chat session corresponding to the chat request. Chat data corresponding to the previous chat session is retrieved from the chat database and sent to the client device. Other embodiments are disclosed.

20 Claims, 8 Drawing Sheets

(56) References Cited

U.S. PATENT DOCUMENTS

| | | |
|---|---|---|
| 8,904,409 B2 | 12/2014 | Jaffer et al. |
| 9,042,540 B2 | 5/2015 | Tuchman et al. |
| 9,519,683 B1 | 12/2016 | Samaddar et al. |
| 2009/0106376 A1 | 4/2009 | Tom et al. |
| 2009/0245500 A1 | 10/2009 | Wampler |
| 2010/0145694 A1 | 6/2010 | Ju et al. |
| 2011/0131207 A1 | 6/2011 | Jonsson |
| 2011/0145236 A1 | 6/2011 | Sobue et al. |
| 2012/0076283 A1 | 3/2012 | Ajmera et al. |
| 2012/0130771 A1 | 5/2012 | Kannan et al. |
| 2012/0300921 A1 | 11/2012 | Jennings |
| 2013/0125227 A1 | 5/2013 | Lu et al. |
| 2013/0262598 A1 | 10/2013 | Makanawala et al. |
| 2013/0317993 A1 | 11/2013 | Wasserman et al. |
| 2014/0255895 A1 | 9/2014 | Shaffer et al. |
| 2014/0355748 A1 | 12/2014 | Conway et al. |
| 2015/0032452 A1 | 1/2015 | Lev-Tov et al. |
| 2015/0032669 A1 | 1/2015 | Winnick |
| 2015/0128058 A1 | 5/2015 | Anajwala |
| 2015/0181039 A1 | 6/2015 | Erhart et al. |
| 2015/0195406 A1 | 7/2015 | Dwyer et al. |
| 2015/0332168 A1 | 11/2015 | Bhagwat et al. |
| 2015/0347900 A1 | 12/2015 | Bell et al. |
| 2016/0034260 A1 | 2/2016 | Ristock et al. |
| 2016/0063126 A1 | 3/2016 | Nelken et al. |
| 2016/0099892 A1 | 4/2016 | Palakovich et al. |
| 2016/0110422 A1 | 4/2016 | Roytman et al. |
| 2016/0292157 A1 | 10/2016 | Zhang et al. |
| 2016/0295018 A1 | 10/2016 | Loftus et al. |
| 2016/0308799 A1 | 10/2016 | Schubert et al. |

SERVICE PLATFORM TO SUPPORT AUTOMATED CHAT COMMUNICATIONS AND METHODS FOR USE THEREWITH

FIELD OF THE DISCLOSURE

This application is a continuation of U.S. patent application Ser. No. 14/801,609, filed Jul. 16, 2015, now U.S. Pat. No. 10,805,244, which is herein incorporated by reference in its entirety.

The subject disclosure relates to customer service provided via a service platform, such as in a communication network.

BACKGROUND OF THE DISCLOSURE

Chat and instant messaging are becoming the preferred means of communication for many consumers. Enterprise companies are starting to move their customer care and sales operations to support those digital channels. These communication media promise to provide better experience and offer cost effective way of communication between service personnel and customers. Chat transactions typically contain dialogs between two or more parties—the customer, and one or more agents. These transactions are typically stored in an archive for training and quality assurance purposes and deleted after few days or weeks.

BRIEF DESCRIPTION OF THE DRAWINGS

Reference will now be made to the accompanying drawings, which are not necessarily drawn to scale, and wherein.

DETAILED DESCRIPTION

Figure 1:
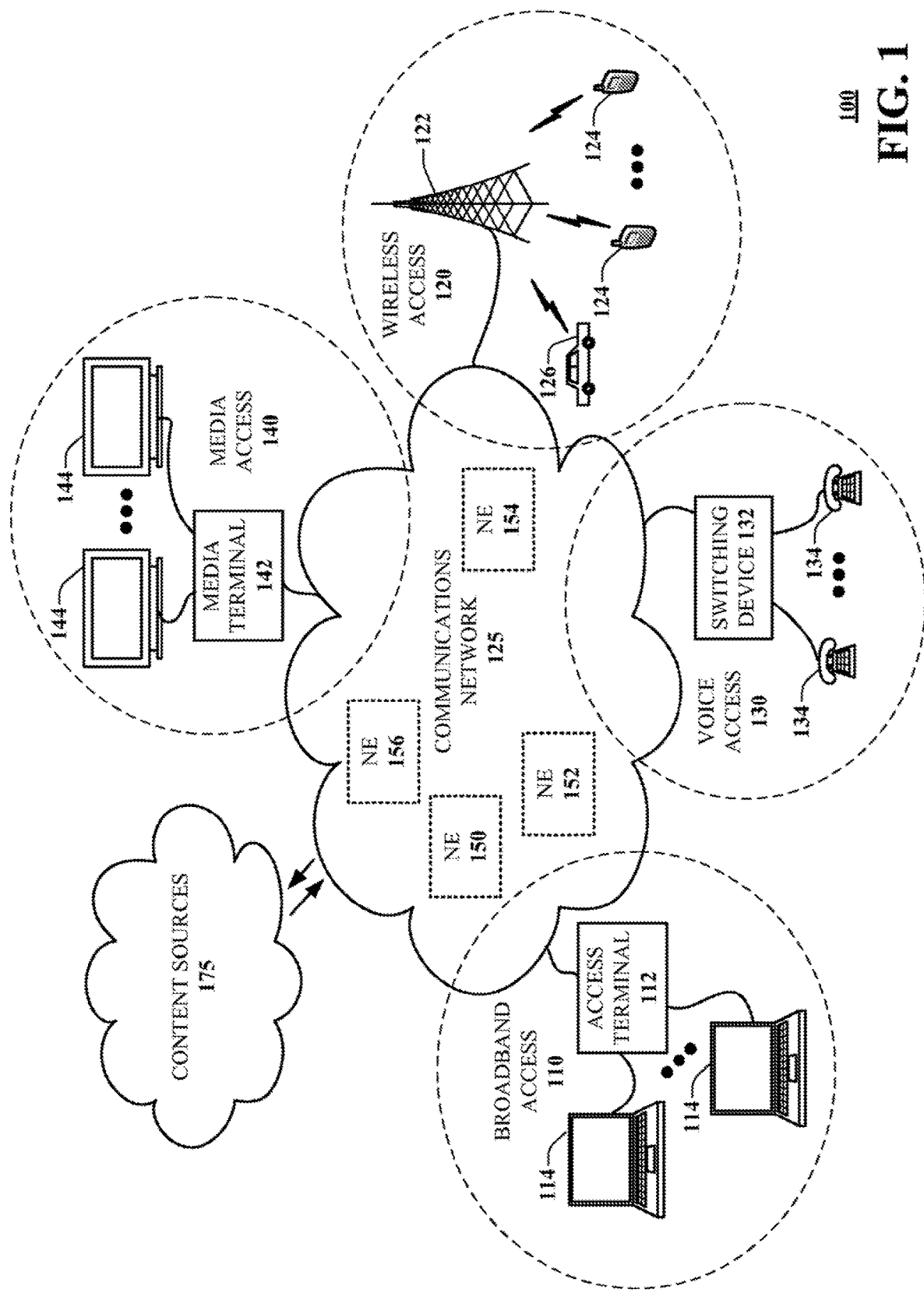
FIG. 1 is a block diagram illustrating an example, non-limiting embodiment of a communications network in accordance with various aspects described herein.

One or more embodiments are now described with reference to the drawings, wherein like reference numerals are used to refer to like elements throughout. In the following description, for purposes of explanation, numerous details are set forth in order to provide a thorough understanding of the various embodiments. It is evident, however, that the various embodiments can be practiced without these details (and without applying to any particular networked environment or standard).

In accordance with one or more embodiments, a service platform includes a processor and a memory that stores executable instructions that, when executed by the processor, facilitate: receiving a chat request from a client device associated with a user; searching a chat database of previous chat sessions associated with other users, based on the chat request, to identify at least one previous chat session corresponding to the chat request; retrieving chat data corresponding to the at least one previous chat session from the chat database; and sending the chat data to the client device.

In accordance with one or more embodiments, a method includes receiving a chat request from a client device associated with a user; searching a chat database of previous chat sessions associated with other users, based on the chat request, to identify a plurality of previous chat sessions corresponding to the chat request; retrieving chat data corresponding to the plurality of previous chat sessions from the chat database; and sending the chat data to the client device.

In accordance with one or more embodiments, machine-readable storage medium, comprising executable instructions that, when executed by a processor, facilitate performance of operations, that include receiving a chat request from a client device associated with a user; searching a chat database of previous chat sessions associated with other users, based on the chat request, to identify at least one previous chat session corresponding to the chat request; retrieving chat data corresponding to the at least one previous chat session from the chat database; and sending the chat data to the client device.

Referring now to FIG. 1, a block diagram 100 illustrating an example, non-limiting embodiment of a communications network in accordance with various aspects described herein, is shown. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text or other media. While broadband access 110, wireless access 120, voice access 130 and media access 140 are shown separately, one or more of these forms of access can be combined to provide multiple access services to a single client device.

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched telephone network, a voice over Internet protocol (VoIP) network, Internet protocol (IP) based television network, a cable network, a passive or active optical network, a 4G or higher wireless access network, WIMAX network, UltraWideband network, personal area network or other wireless access network, a broadcast satellite network, the Internet, an extranet, a virtual private network and/or other communications network.

In various embodiments, the access terminal 112 can include a digital subscriber line access multiplexer (DSLAM), cable modem termination system (CMTS), optical line terminal (OLT) or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G or higher modem, an optical modem and/or other access devices.

In various embodiments, the base station or access point 122 can include a 4G or higher base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches, voice services platforms, mobile services platforms, stream media services platforms, customer service delivery platforms and other network nodes for routing and controlling communications traffic over wired, optical and wireless links as part of the Internet and other public networks as well as one or more private networks, for managing subscriber access, for billing and network management, for providing customer support and service and/or for supporting other network functions.

Figure 2:
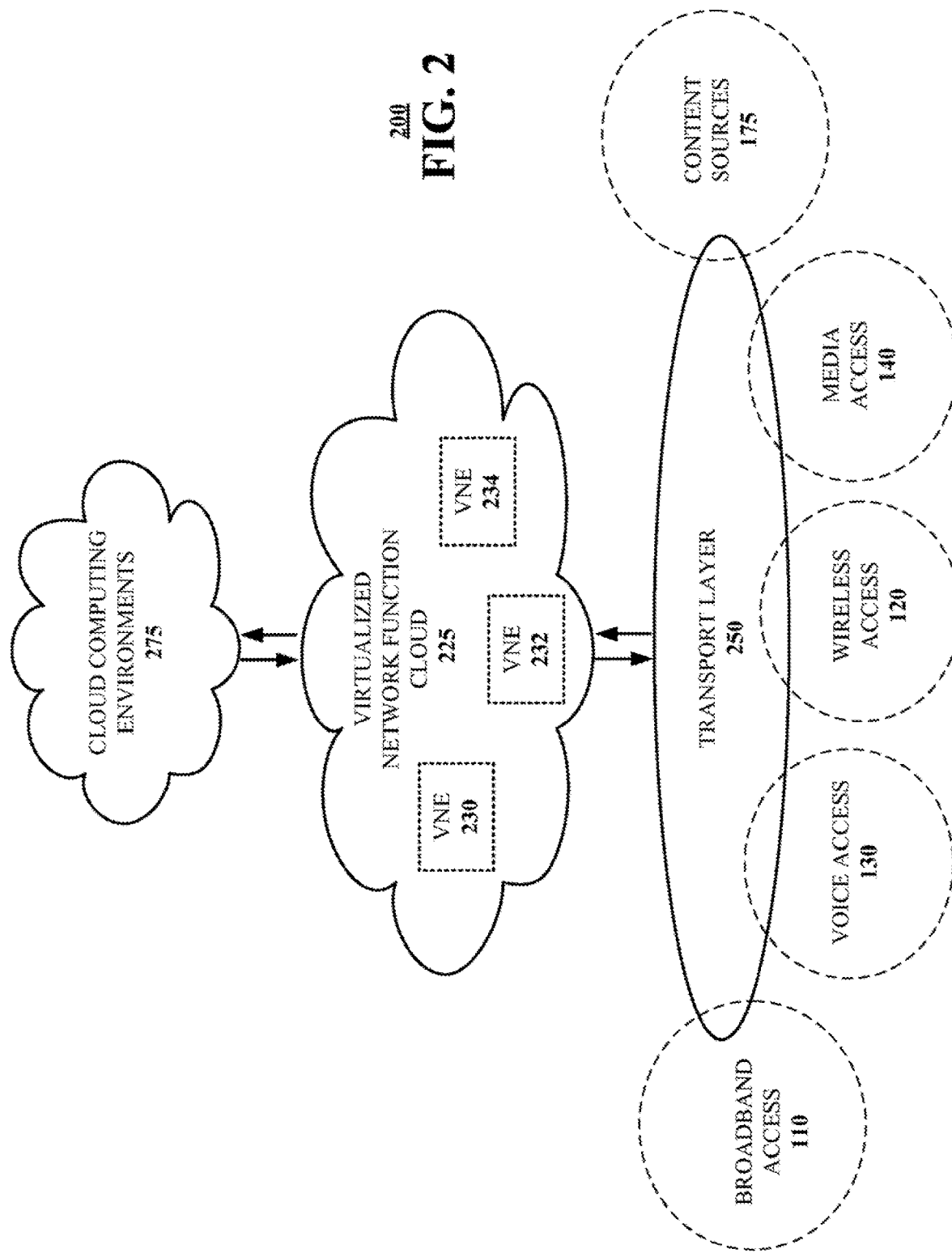
FIG. 2 is a block diagram illustrating an example, non-limiting embodiment of a virtualized communication network in accordance with various aspects described herein.

Referring now to FIG. 2, a block diagram 200 illustrating an example, non-limiting embodiment of a virtualized communication network in accordance with various aspects described herein, is shown. In particular a virtualized communication network is presented that can be used to implement some or all of the communications network 125 presented in conjunction with FIG. 1.

In particular, a cloud networking architecture is shown that leverages cloud technologies and supports rapid innovation and scalability via a transport layer 250, virtualized network function cloud 225 and/or one or more cloud computing environments 275. In various embodiments, this cloud networking architecture is an open architecture that leverages application programming interfaces (APIs), reduces complexity from services and operations; supports more nimble business models and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 230, 232, 234, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrate. The most typical type of substrate being servers that support Network Function Virtualization (NFV), followed by packet forwarding capabilities based on generic computing resources, with specialized network technologies brought to bear when general purpose processors or merchant silicon are not appropriate. In this case, communication services can be implemented as cloud-centric workloads.

As an example, a traditional network element 150, such as an edge router can be implemented via a virtual network element 230 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing that infrastructure easier to manage.

In an embodiment, the transport layer 250 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as virtual network elements 230, 232 or 234. These network elements can be included in transport layer 250.

The virtualized network function cloud 225 interfaces with the transport layer 250 via APIs or other interfaces to allow the virtual network elements 230, 232, 234, etc. to provide specific NFVs. In particular, the virtualized network function cloud 225 leverages cloud operations, applications, and architectures to support networking workloads. The virtualized network elements 230, 232 and 234 can employ network function software that provides either a one-for-one mapping of traditional network element function or alternately some combination of network functions designed for cloud computing. For example, virtualized network elements 230, 232 and 234 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers, voice services platforms, mobile services platforms, customer service delivery platforms, content delivery network components and other network elements. Because these elements don't typically need to forward large aggregates of traffic, their workload can be distributed across a number of servers—each of which adds a portion of the capability, and overall which creates an elastic function with higher availability than its former monolithic version. These virtual network elements 230, 232, 234, etc. can be instantiated and managed using an orchestration approach similar to those used in cloud compute services.

The cloud computing environments 275 can interface with the virtualized network function cloud 225 via APIs that expose functional capabilities of the VNE 230, 232, 234, etc. to provide the flexible and expanded capabilities to the virtualized network function cloud 225. In particular, network workloads may have applications distributed across the virtualized network function cloud 225 and cloud computing environment 275 and in the commercial cloud, or might simply orchestrate workloads supported entirely in NFV infrastructure from these third party locations.

Figure 3:
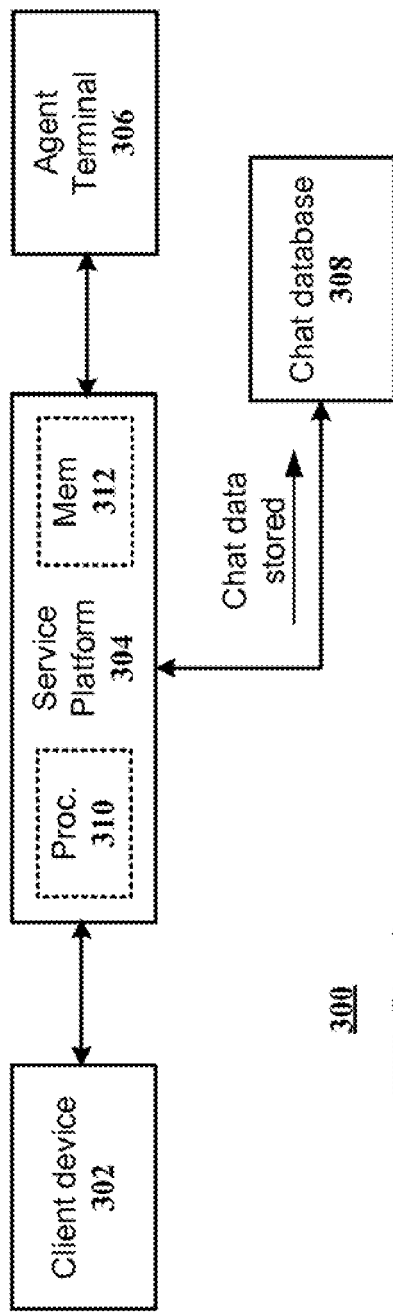
FIG. 3 is a block diagram illustrating an example, non-limiting embodiment of a service platform in accordance with various aspects described herein.

Turning now to FIG. 3, a block diagram 300 is shown illustrating an example, non-limiting embodiment of a service platform in accordance with various aspects described herein. In particular a service platform 304 is presented for providing customer service to a client device 302 such as a data terminal 114, mobile device 124, vehicle 126 or other client device compatible with chat communication. As used herein "chat" includes online chat, instant messaging, synchronous text conferencing, text messaging, computer mediates messaging and other text-based communication between a user of the client device 302, an agent terminal 306 such as a data terminal 114 configured for chat communication with a live agent or other device, and/or in an automated fashion via service platform 304. The service platform 304 can be implemented via a network element 150, 152, 154 or 156, a virtual network element 230, 232 or 234, via cloud computing environment 275 or other service platform that operates in conjunction with a communication network such as communications network 125. The customer services presented in conjunction with the service platform 304 can be related to the services of communications network 125 or other enterprise that uses chat communication via communications network 125 to provide customer service to their customers. In various embodiments the communications between the service platform 304, client device 302, agent terminal 306 and chat database 308 can be via an HTTP protocol, HTTPS protocol, other Internet based messaging protocol, SMS or other text-based messaging protocol and/or other communication protocol.

The service platform 304 includes a processor 310 and a memory 312 that stores executable instructions that, when executed by the processor 310, facilitate the performance of various operations. In one such operation, a chat session is established between the agent terminal 306, such as with a live agent, and the user of client device 302. The chat data is collected and stored in the chat database 308 for re-use not only for training and quality assurance purposes, but also for use in providing customer service in an automated fashion with subsequent users. For example, the service platform 304 can use the chat database 308 to support automated chat customer care, with live agents used only when required. This form of automation enables enterprise customer service centers to provide scalable and cost effective digital customer care.

In various embodiments, the chat data is collected by anonymizing the text from chat sessions of prior users. The anonymization processing can include removing sensitive personal information of the user such as user name, messaging and communication addresses, account numbers, and other personal information of the user. In various embodiments, the sensitive personal information that has been removed can be obscured, replaced by generic placeholder information in order to provide context for the communication, or simply removed altogether. The service platform 304 can optionally process the chat session data to remove inappropriate language, correct misspellings, translate informal speech and/or otherwise clean the chat session text to create chat data that is in better condition to be shared with subsequent users, to improve readability and/or to remove inappropriate content.

In addition, the collection of chat data can include a selection process to identify particular chat sessions to store. Agent terminal 306 can be used by a live agent to identify a particular chat session that seems to a good candidate for inclusion in the chat database based on policy factors such as: favorable resolution of a problem that did not require agent action other than directing the user on how to resolve a particular problem; chat sessions that are not unduly repetitive with other chat requests and that seem to address new issues; and/or chat sessions that represent concise, complete and understandable communications by the user.

In addition or in the alternative, the service platform 304 can identify particular chat sessions to store based on a policy factor such as the experience and expertise of the particular agent. In particular agents can be rated based metrics such as service grade, confidence score, agent performance and/or survey data. Other policy factors can also be used to determine chat sessions to store such as: whether or not the user indicated that the problem was satisfactorily resolved; whether or not the request required agent action other than directing the user on how to resolve the issue; whether or not the chat session is devoid of inappropriate language, misspellings and/or informal speech; and/or whether or not the length of the chat session is below a particular word count. In this fashion the chat database 308 can be created in a controlled way based on the best information that is available, the most effective advice, and to span issues that might not be addressed elsewhere on a company website or through other sources.

In various embodiments the chat database 308 is stored as simply a full-text database that is word-searchable based on incoming chat requests. In addition, the chat data that is collected can optionally be indexed based on key words and problem categories that are either contained in the chat data or in other data associated with the chat request. Further, metadata associated with a chat request such as a geographical location of the client device 302, demographic data associated with the user of client device 302, service type and/or other data associated with the chat request, problem resolution and particular user can be stored in conjunction with the chat data to aid in search and retrieval of information that is pertinent a chat request of a future user and/or that is matched as closely as possible to the demographics of a future user. The chat database 308 can be implemented via either SQL or NoSQL database techniques.

The chat database 308 can be used in conjunction with service platform 304 to provide a learning system, expert system or other knowledge-based system for providing customer care. Consider an example where a customer associated with mobile device 124 implementation of a client device 302 issues a chat request to engage an agent with a chat conversation.

In various embodiments, a user may speak to the system and have the speech converted to text. For example, a speech to text function on the mobile device 124, such as a dedicated customer service app or other speech to text utility allows the user to speak the chat request and have it converted to text for use by the service platform 304.

The service platform 304 operates as an expert system to examine its knowledge database contained in chat database 308 to identify chats from other customers that may address the issue. For example, the system can discover corresponding chats based on the ones that best respond to the input query. Beside the input query, the system may use other features to make such a determination including customer demographics, previous chats made by the customer, time of day, etc.

The top N (1, 2, 3, ... ) previous chat sessions can be presented to the customer. In particular, the service platform 304 can apply machine learning capability to identify chats in the knowledge database that would address the customer issue with very high confidence. If the expert system is unable to find previous chat sessions with high confidence or the customer receives the chat data and still indicates a desire for a live chat session (such as when the customer is not satisfied by the chat data provided and/or believes the chat request has not been satisfied), then it establishes a live chat session between the customer and the agent terminal 306. Upon successful completion of the chat the chat session can be placed in the chat database 308.

In one example of operation, the live agent at the agent terminal 306 can controllably escalate the chat session to alternative media. For example, at a basic level the chat session operates via simple text. At a first enhanced level the chat session is escalated to text and voice or a voice only call should the live agent determine that a voice conversation may resolve the user's issue faster. In a second enhanced level, the chat session is escalated to text, voice and video should the live agent determine that a video conversation may resolve the user's issue faster. In each case, the escalation of the chat session can be controlled, if needed, to enhance the customer care experience and increase the opportunity to resolve the case with a speedy resolution to the request.

In this fashion, some chat requests can be handled in an automated fashion, without the need for intervention by a live agent. Chat sessions that require live agents and/or enhanced communication receive the resources they require. Further examples and implementations including one or more optional functions and features are presented in conjunction with FIGS. 4-8 that follow.

Figure 4:
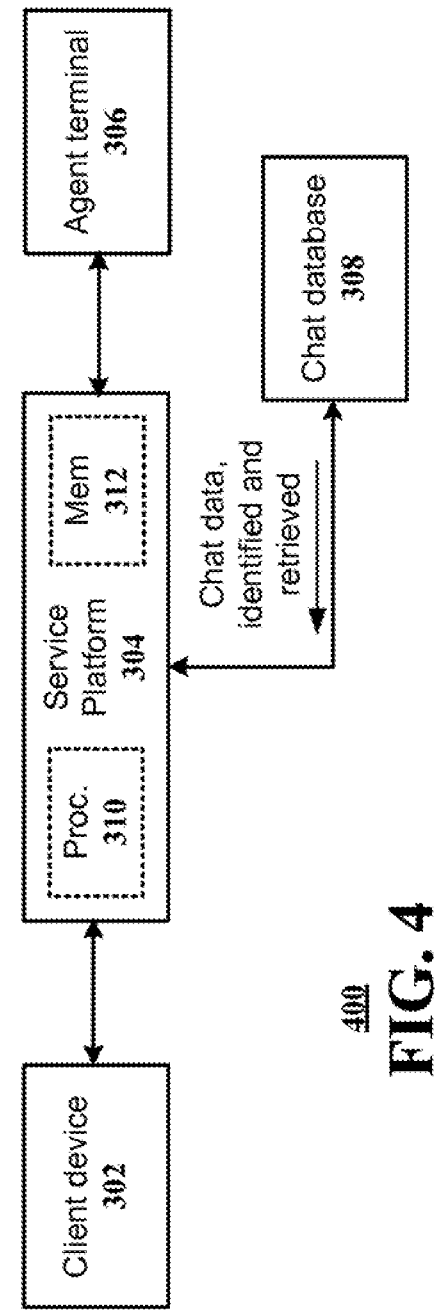
FIG. 4 is a block diagram illustrating an example, non-limiting embodiment of a service platform in accordance with various aspects described herein.

Turning now to FIG. 4, a block diagram 400 is shown illustrating an example, non-limiting embodiment of a service platform in accordance with various aspects described herein. In particular, the service platform of FIG. 3 is presented again and will be further described in conjunction with the automated response to a chat request by a user of client device 302 including the search and retrieval of chat data from the chat database 308.

In operation, the service platform 304 receives a chat request from the client device 302 associated with a user. The service platform 304 searches the previous chat sessions (associated with other users) stored in the chat database 308, based on the chat request, to identify one or more previous chat sessions corresponding to the chat request.

In various embodiments, one or more words associated with the chat request can be identified from the chat request and text mining can be used to search the chat database 308 based on these word(s). One or more previous chats can be determined to correspond to the chat request by determining a confidence, such as a statistical confidence, that the previous chat sessions correspond to the chat request and determining that the confidence corresponding to the previous chat sessions exceeds a confidence threshold.

By way of example, a term frequency-inverse document frequency (TFIDF) can be used to evaluate how important a word from a chat request is to a particular previous chat session contained in the chat database 308. TFIDF, for example, works by treating each chat session as a document. It then compares each chat request with previous chat documents and identifies the top ranked results. In this particular measure, importance increases proportionally to the number of times a word appears in the document but is offset by the frequency of the word in the overall database. Consider a particular term to be represented by t. The term frequency, TF(t) can be calculated as:

$$TF(t) = (\text{Number of times } t \text{ appears in a chat session})/(\text{Total number of terms in the chat session}).$$

The Inverse Document Frequency, IDF(t) can be calculated as:

$$IDF(t) = \log\_e(\text{Total number of chat sessions in the database/Number of chat sessions with } t \text{ in it}).$$

While computing TF(t), all terms are considered equally important. However it is known that certain terms, such as "is", "of", and "that", may appear a lot of times but have little importance. IDF(t) weigh down the frequent terms while scale up the rare ones. An overall TF–IDF(t) can be found based on the product of both as:

$$TF\text{–}IDF(t) = TF(t)*IDF(t)$$

The TF–IDF(t) can be used alone or applied to another statistical distribution to determine a statistical confidence and/or rank. While TFIDF techniques are described above, other statistical measures and/or other database search techniques can be used as well.

In various embodiments, the service platform 304 looks for N previous chat sessions that satisfy the search criteria, for instance, the N previous chat sessions that satisfy the confidence threshold and have the highest confidence. As previously discussed, chat sessions can also be ranked based on fit to demographics of the user, geographical location of the client device 302, etc., in order to select the previous chat sessions that satisfy the search criteria and provide the greatest likelihood that they will relate to the user and assist in satisfying user's chat request.

If N previous chat sessions can be identified, then chat data corresponding to the previous chat sessions is retrieved from the chat database and sent to the client device 302. The chat data can be sent one at a time or sequentially for the user to review. If the user indicates to the service platform 304 that the chat request has been satisfied, i.e., the user has found the information they need, then the chat session can be terminated.

If however, the user indicates to the service platform 304 that the chat data has failed to satisfy the chat request or otherwise indicates a desire to proceed to a live chat session, the service platform 304 can establish a chat session between the user of the client device 302 and the agent terminal 306 in order to attempt to the satisfy the chat request in a less automated and more interactive session. Similarly, if the service platform 304 determines that the required N previous chat sessions cannot be identified, the service platform 304 can establish a chat session between the user of the client device 302 and the agent terminal 306 in order to attempt to the satisfy the chat request. As previously discussed, speech to text conversion can be employed to generate a chat request. In addition, speech to text conversion as well as text to speech conversion can similarly be employed to facilitate a chat session with a user, such as a user of a mobile device 124, in a hands free mode of operation. As previously discussed, the controlled escalation of the chat session to include voice and/or video communication, if needed, to enhance the customer care experience and increase the opportunity to resolve the case in an expedient fashion.

Figure 5A:
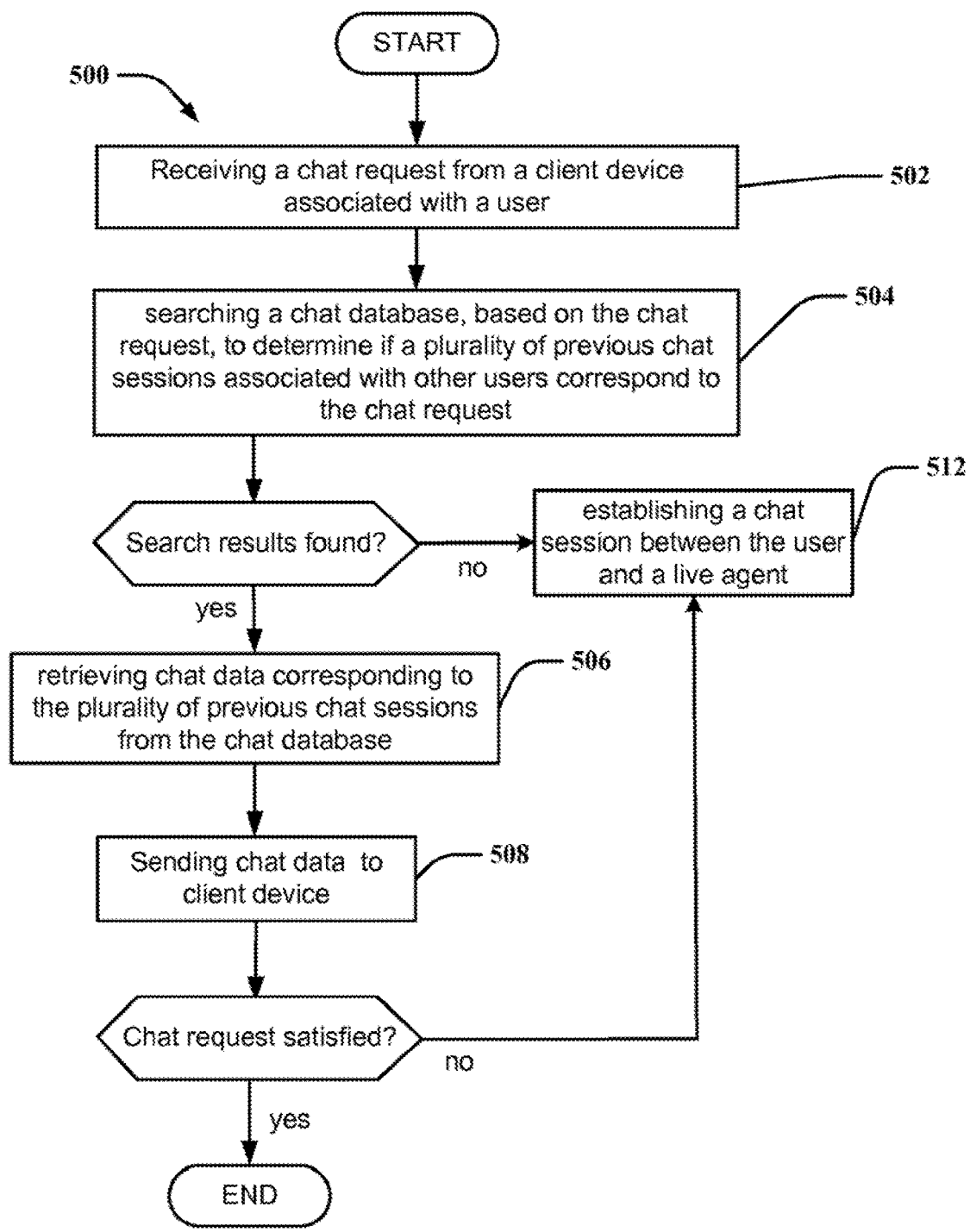
FIG. 5A illustrates a flow diagram of an example, non-limiting embodiment of a method in accordance with various aspects described herein.

Turning now to FIG. 5A, a flow diagram 500 is shown of an example, non-limiting embodiment of a method. In particular, a method is presented for use with one or more functions and features presented in conjunction with FIGS. 1-4. Step 502 includes receiving a chat request from a client device associated with a user. Step 504 includes searching a chat database of previous chat sessions associated with other users, based on the chat request, to identify a plurality of previous chat sessions corresponding to the chat request. If search results are found, the method proceeds to step 506 of retrieving chat data corresponding to the plurality of previous chat sessions from the chat database and step 508 of sending the chat data to the client device. If the chat request is satisfied, as indicated by the user, the session ends. If however, a plurality of previous chat sessions corresponding to the chat request cannot be identified after search of the chat database, or the user indicates that the chat request is not satisfied, the method proceeds to step 512 of establishing a chat session between the user and a live agent.

Figure 5B:
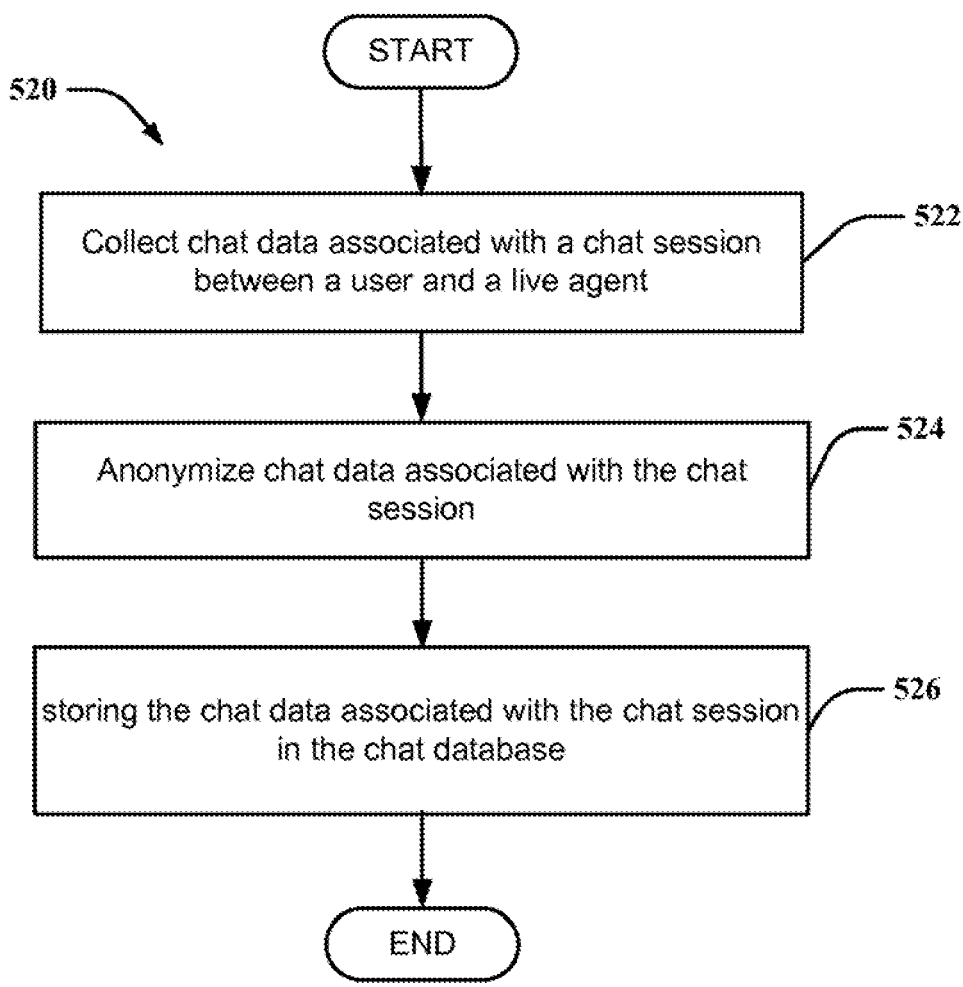
FIG. 5B illustrates a flow diagram of an example, non-limiting embodiment of a method in accordance with various aspects described herein.

Turning now to FIG. 5B, a flow diagram 520 is shown of an example, non-limiting embodiment of a method. In particular, a method is presented for use with one or more functions and features presented in conjunction with FIGS. 1-5A. Step 522 includes collecting chat data associated with a chat session between a user and a live agent. Step 524 includes anonymizing the chat data associated with the chat session such as by removing personal information associated with the user in the chat data associated with the chat session. Step 526 includes storing the chat data associated with the chat session in a chat database.

While for purposes of simplicity of explanation, the respective processes are shown and described as a series of blocks in FIGS. 5A and 5B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 6:
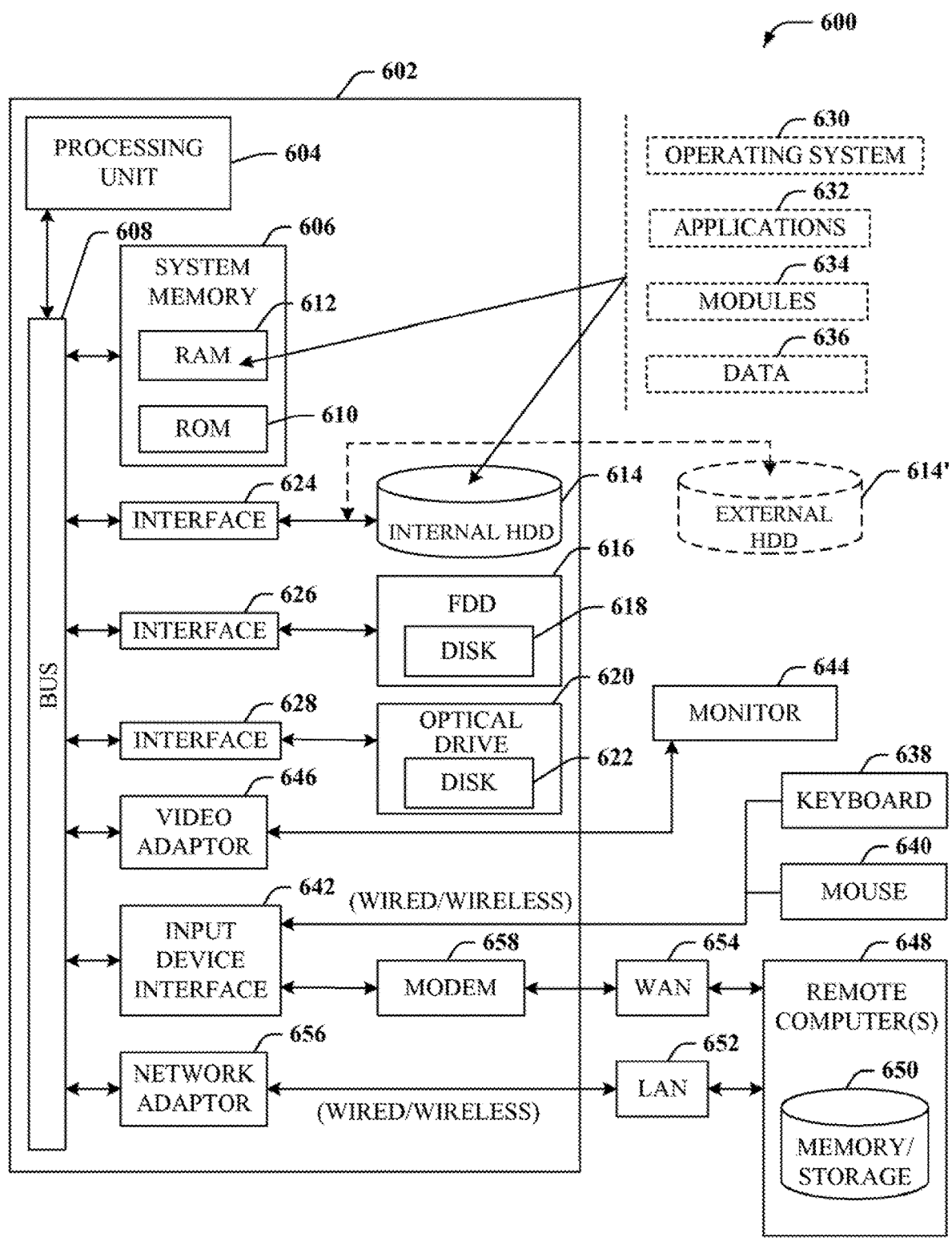
FIG. 6 is a block diagram of an example, non-limiting embodiment of a computing environment in accordance with various aspects described herein.

Turning now to FIG. 6, there is illustrated a block diagram of a computing environment in accordance with various aspects described herein. In order to provide additional context for various embodiments of the embodiments described herein, FIG. 6 and the following discussion are intended to provide a brief, general description of a suitable computing environment 600 in which the various embodiments of the subject disclosure can be implemented. In particular, computing environment 600 can be used in the implementation of service platform 304, chat database 308, agent terminal 306, network elements 150, 152, 154, 156, access terminal 112, base station or access point 122, switching device 132, media terminal 142, and/or virtual network elements 230, 232, 234, etc. Each of these devices can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes processor as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 6, the example environment can comprise a computer 602, the computer 602 comprising a processing unit 604, a system memory 606 and a system bus 608. The system bus 608 couples system components including, but not limited to, the system memory 606 to the processing unit 604. The processing unit 604 can be any of various commercially available processors. Dual microprocessors and other multiprocessor architectures can also be employed as the processing unit 604.

The system bus 608 can be any of several types of bus structure that can further interconnect to a memory bus (with or without a memory controller), a peripheral bus, and a local bus using any of a variety of commercially available bus architectures. The system memory 606 comprises ROM 610 and RAM 612. A basic input/output system (BIOS) can be stored in a non-volatile memory such as ROM, erasable programmable read only memory (EPROM), EEPROM, which BIOS contains the basic routines that help to transfer information between elements within the computer 602, such as during startup. The RAM 612 can also comprise a high-speed RAM such as static RAM for caching data.

The computer 602 further comprises an internal hard disk drive (HDD) 614 (e.g., EIDE, SATA), which internal hard disk drive 614 can also be configured for external use as external HDD 614' in a suitable chassis (not shown), a magnetic floppy disk drive (FDD) 616, (e.g., to read from or write to a removable diskette 618) and an optical disk drive 620, (e.g., reading a CD-ROM disk 622 or, to read from or write to other high capacity optical media such as the DVD). The hard disk drive 614, magnetic disk drive 616 and optical disk drive 620 can be connected to the system bus 608 by a hard disk drive interface 624, a magnetic disk drive interface 626 and an optical drive interface 628, respectively. The interface 624 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 602, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 612, comprising an operating system 630, one or more application programs 632, other program modules 634 and program data 636. All or portions of the operating system, applications, modules, and/or data can also be cached in the RAM 612. The systems and methods described herein can be implemented utilizing various commercially available operating systems or combinations of operating systems.

A user can enter commands and information into the computer 602 through one or more wired/wireless input devices, e.g., a keyboard 638 and a pointing device, such as a mouse 640. Other input devices (not shown) can comprise a microphone, an infrared (IR) remote control, a joystick, a game pad, a stylus pen, touch screen or the like. These and other input devices are often connected to the processing unit 604 through an input device interface 642 that can be coupled to the system bus 608, but can be connected by other interfaces, such as a parallel port, an IEEE 1394 serial port, a game port, a universal serial bus (USB) port, an IR interface, etc.

A monitor 644 or other type of display device can be also connected to the system bus 608 via an interface, such as a video adapter 646. It will also be appreciated that in alternative embodiments, a monitor 644 can also be any display device (e.g., another computer having a display, a smart phone, a tablet computer, etc.) for receiving display information associated with computer 602 via any communication means, including via the Internet and cloud-based networks. In addition to the monitor 644, a computer typically comprises other peripheral output devices (not shown), such as speakers, printers, etc.

The computer 602 can operate in a networked environment using logical connections via wired and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically comprises many or all of the elements described relative to the computer 602, although, for purposes of brevity, only a memory/storage device 650 is illustrated. The logical connections depicted comprise wired/wireless connectivity to a local area network (LAN) 652 and/or larger networks, e.g., a wide area network (WAN) 654. Such LAN and WAN networking environments are commonplace in offices and companies, and facilitate enterprise-wide computer networks, such as intranets, all of which can connect to a global communications network, e.g., the Internet.

When used in a LAN networking environment, the computer 602 can be connected to the local network 652 through a wired and/or wireless communication network interface or adapter 656. The adapter 656 can facilitate wired or wireless communication to the LAN 652, which can also comprise a wireless AP disposed thereon for communicating with the wireless adapter 656.

When used in a WAN networking environment, the computer 602 can comprise a modem 658 or can be connected to a communications server on the WAN 654 or has other means for establishing communications over the WAN 654, such as by way of the Internet. The modem 658, which can be internal or external and a wired or wireless device, can be connected to the system bus 608 via the input device interface 642. In a networked environment, program modules depicted relative to the computer 602 or portions thereof, can be stored in the remote memory/storage device 650. It will be appreciated that the network connections shown are example and other means of establishing a communications link between the computers can be used.

The computer 602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 7:
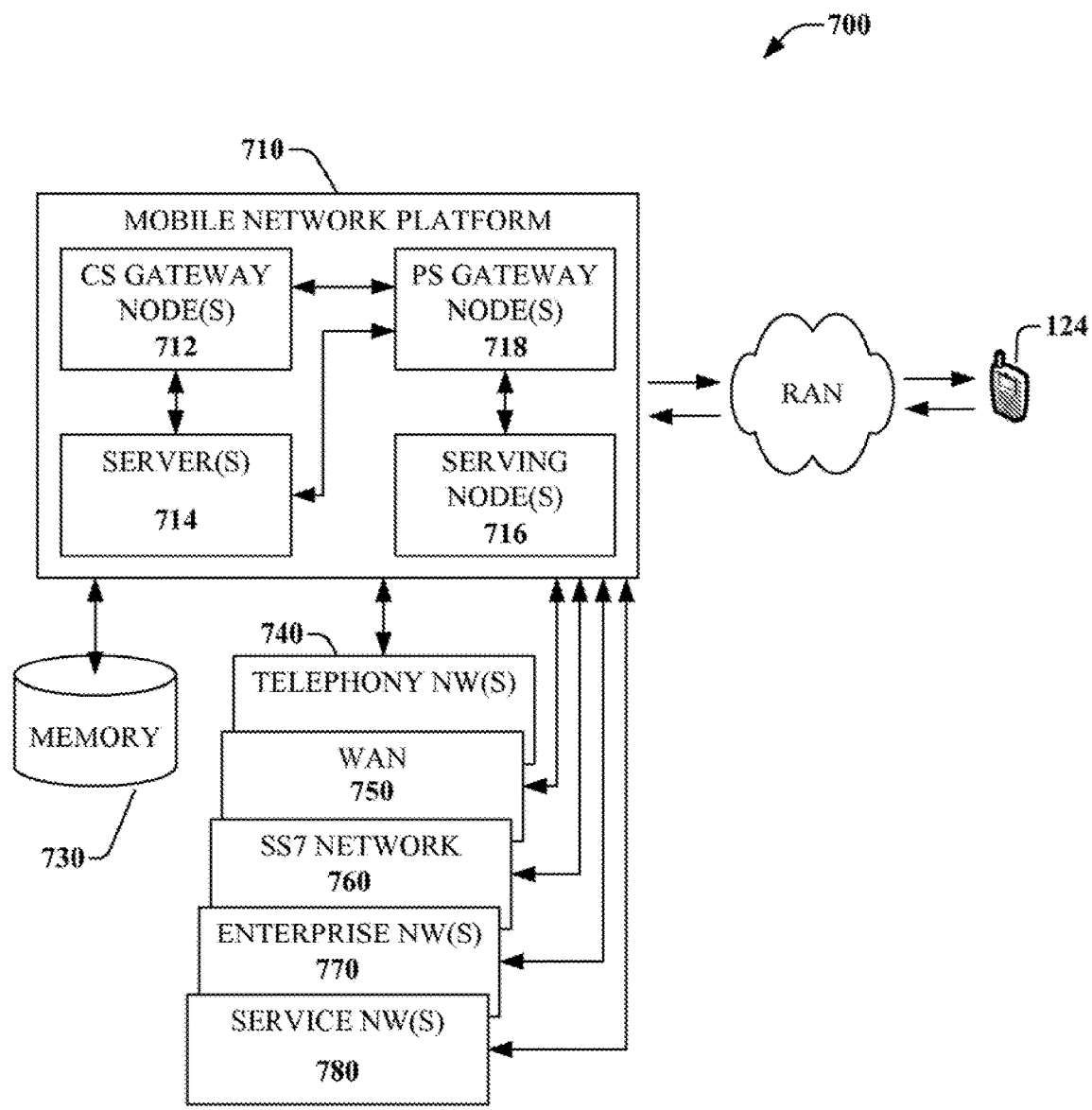
FIG. 7 is a block diagram of an example, non-limiting embodiment of a mobile network platform in accordance with various aspects described herein.

Turning now to FIG. 7, an embodiment 700 of a mobile network platform 710 is shown that is an example of network elements 150, 152, 154, 156, and/or virtual network elements 230, 232, 234, etc. In one or more embodiments, the mobile network platform 710 can generate and receive signals transmitted and received by base stations or access points such as base station or access point 122 for communication with a mobile device 124. Generally, wireless network platform 710 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 710 can be included in telecommunications carrier networks, and can be considered carrier-side components as discussed elsewhere herein. Mobile network platform 710 comprises CS gateway node(s) 712 which can interface CS traffic received from legacy networks like telephony network(s) 740 (e.g., public switched telephone network (PSTN), or public land mobile network (PLMN)) or a signaling system #7 (SS7) network 760. Circuit switched gateway node(s) 712 can authorize and authenticate traffic (e.g., voice) arising from such networks. Additionally, CS gateway node(s) 712 can access mobility, or roaming, data generated through SS7 network 760; for instance, mobility data stored in a visited location register (VLR), which can reside in memory 730. Moreover, CS gateway node(s) 712 interfaces CS-based traffic and signaling and PS gateway node(s) 718. As an example, in a 3GPP UMTS network, CS gateway node(s) 712 can be realized at least in part in gateway GPRS support node(s) (GGSN). It should be appreciated that functionality and specific operation of CS gateway node(s) 712, PS gateway node(s) 718, and serving node(s) 716, is provided and dictated by radio technology(ies) utilized by mobile network platform 710 for telecommunication.

In addition to receiving and processing CS-switched traffic and signaling, PS gateway node(s) 718 can authorize and authenticate PS-based data sessions with served mobile devices. Data sessions can comprise traffic, or content(s), exchanged with networks external to the wireless network platform 710, like wide area network(s) (WANs) 750, enterprise network(s) 770, and service network(s) 780, which can be embodied in local area network(s) (LANs), can also be interfaced with mobile network platform 710 through PS gateway node(s) 718. It is to be noted that WANs 750 and enterprise network(s) 770 can embody, at least in part, a service network(s) like IP multimedia subsystem (IMS). Based on radio technology layer(s) available in technology resource(s) 717, packet-switched gateway node(s) 718 can generate packet data protocol contexts when a data session is established; other data structures that facilitate routing of packetized data also can be generated. To that end, in an aspect, PS gateway node(s) 718 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 700, wireless network platform 710 also comprises serving node(s) 716 that, based upon available radio technology layer(s) within technology resource(s) 717, convey the various packetized flows of data streams received through PS gateway node(s) 718. It is to be noted that for technology resource(s) that rely primarily on CS communication, server node(s) can deliver traffic without reliance on PS gateway node(s) 718; for example, server node(s) can embody at least in part a mobile switching center. As an example, in a 3GPP UMTS network, serving node(s) 716 can be embodied in serving GPRS support node(s) (SGSN).

For radio technologies that exploit packetized communication, server(s) 714 in wireless network platform 710 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 710. Data streams (e.g., content(s) that are part of a voice call or data session) can be conveyed to PS gateway node(s) 718 for authorization/authentication and initiation of a data session, and to serving node(s) 716 for communication thereafter. In addition to application server, server(s) 714 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 710 to ensure network's operation and data integrity in addition to authorization and authentication procedures that CS gateway node(s) 712 and PS gateway node(s) 718 can enact. Moreover, provisioning server(s) can provision services from external network(s) like networks operated by a disparate service provider; for instance, WAN 750 or Global Positioning System (GPS) network(s) (not shown). Provisioning server(s) can also provision coverage through networks associated to wireless network platform 710 (e.g., deployed and operated by the same service provider), such as the distributed antennas networks shown in FIG. 1(s) that enhance wireless service coverage by providing more network coverage.

It is to be noted that server(s) 714 can comprise one or more processors configured to confer at least in part the functionality of macro wireless network platform 710. To that end, the one or more processor can execute code instructions stored in memory 730, for example. It is should be appreciated that server(s) 714 can comprise a content manager, which operates in substantially the same manner as described hereinbefore.

In example embodiment 700, memory 730 can store information related to operation of wireless network platform 710. Other operational information can comprise provisioning information of mobile devices served through wireless network platform 710, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 730 can also store information from at least one of telephony network(s) 740, WAN 750, enterprise network(s) 770, or SS7 network 760. In an aspect, memory 730 can be, for example, accessed as part of a data store component or as a remotely connected memory store.

In order to provide a context for the various aspects of the disclosed subject matter, FIG. 7, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 8:
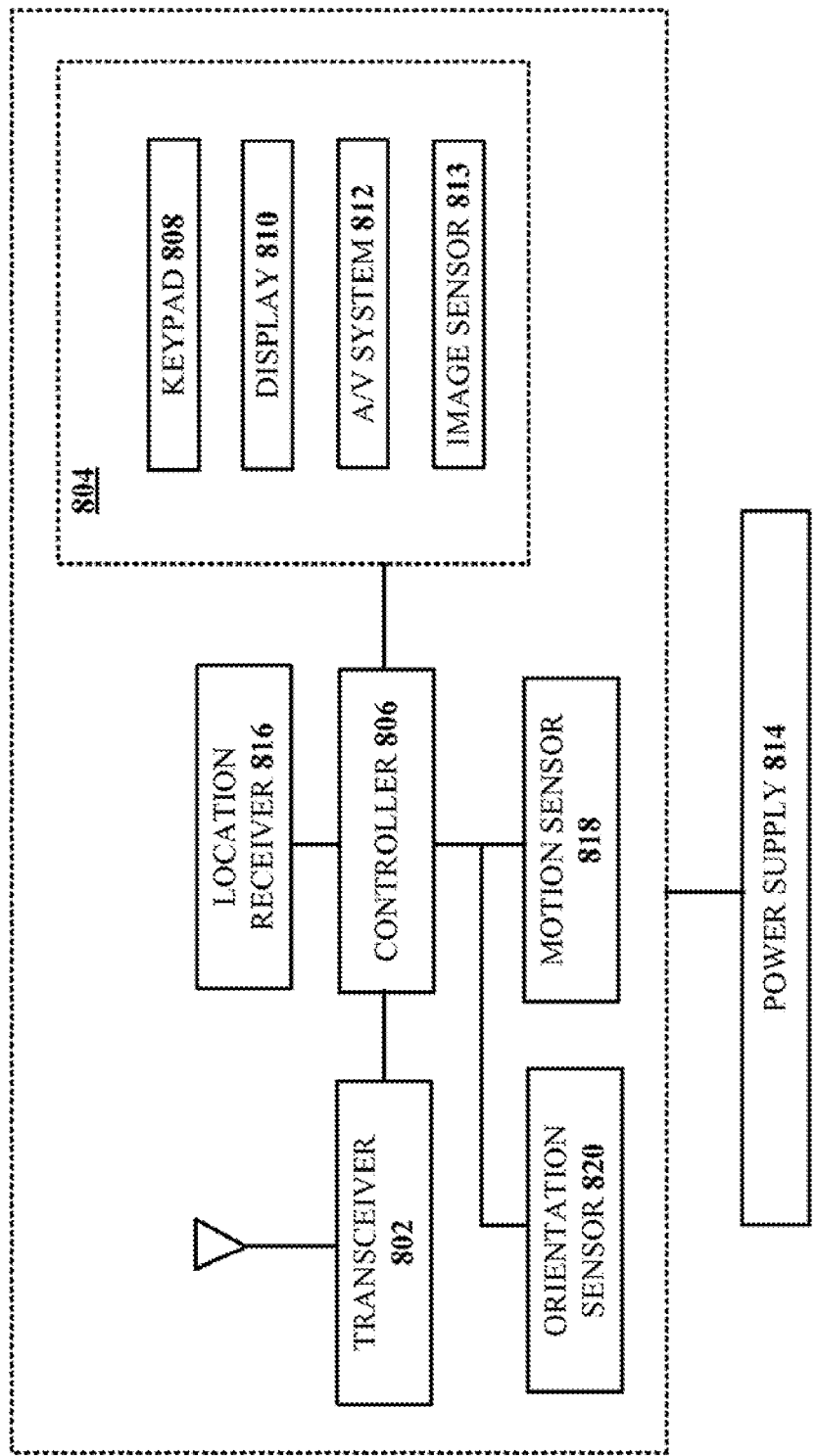
FIG. 8 is a block diagram of an example, non-limiting embodiment of a communication device in accordance with various aspects described herein.

Turning now to FIG. 8, an illustrative embodiment of a communication device 800 is shown. The communication device 800 can serve as an illustrative embodiment of devices such as client device 302, data terminals 114, mobile devices 124, vehicle 126, display devices 144 or other client devices for communication via either communications network 125.

The communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800.

In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface having graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable communications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=confidence\ (class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. An apparatus comprising:
   a processor; and
   a computer-readable medium storing instructions which, when executed by the processor, cause the processor to perform operations, the operations comprising:
   storing chat data for each of a plurality of previous chat sessions in a chat database;
   receiving a chat request from a client device associated with a user;
   identifying, by searching the chat database, a subset of the plurality of previous chat sessions that corresponds to the chat request, wherein the subset of the plurality of previous chat sessions corresponding to the chat request is associated with other users, wherein the identifying the subset of the plurality of previous chat sessions corresponding to the chat request includes determining a confidence that the subset of the plurality of previous chat sessions corresponds to the chat request exceeds a confidence threshold;
   when the subset of the plurality of previous chat sessions includes at least a predetermined number of previous chat sessions that are associated with the other users:
   determining a ranking of the subset of the plurality of previous chat sessions based on the confidence determined for each of the subset of the plurality of previous chat sessions;
   selecting exactly the predetermined number of highest ranked previous chat sessions from the subset of the plurality of previous chat sessions in accordance with the ranking;
   retrieving chat data corresponding to the exactly the predetermined number of highest ranked previous chat sessions from the chat database; and
   sending the chat data corresponding to the exactly the predetermined number of highest ranked previous chat sessions to the client device; and
   when less than the predetermined number of previous chat sessions corresponding to the chat request are identified in the subset of the plurality of previous chat sessions:
   establishing a chat session between the user and a live agent when less than the predetermined number of previous chat sessions corresponding to the chat request are identified in the subset of the plurality of previous chat sessions.

2. The apparatus of claim 1, wherein a media format of the chat session between the user and the live agent is controlled via an agent terminal associated with the live agent, the operations further comprising:
   facilitating operation of the chat session between the user and the live agent via a first media; and
   escalating the chat session between the user and the live agent to operate via a second media, wherein the first media includes text, and wherein the second media includes voice and video.

3. The apparatus of claim 1, wherein the determining the ranking of the subset of the plurality of previous chat sessions is further based on at least one of: demographics of the user, or a geographic location of the client device.

4. The apparatus of claim 1, wherein the chat data of each of the plurality of previous chat sessions in the chat database includes text corresponding to each of the plurality of previous chat sessions, wherein the searching includes identifying at least one word associated with the chat request and text mining the chat data of the plurality of previous chat sessions in the chat database based on the at least one word, and wherein the identifying the subset of the plurality of previous chat sessions corresponding to the chat request includes evaluating at least one term frequency and inverse document frequency associated with the at least one word and the subset of the plurality of previous chat sessions.

5. The apparatus of claim 1, wherein the chat data includes text collected in a corresponding one of the subset of the plurality of previous chat sessions.

6. The apparatus of claim 1, wherein the operations further comprise:
   collecting chat data associated with the chat session between the user and the live agent;
   anonymizing the chat data associated with the chat session;
   cleaning the chat data associated with the chat session to improve readability and to remove inappropriate content, wherein the chat data associated with the chat session after the anonymizing and the cleaning is added to the chat database; and
   retrieving the chat data corresponding to the chat session between the user and the live agent and sending the chat data corresponding to the chat session to another client device for review by a subsequent user based on another chat request received from the another client device associated with the subsequent user.

7. The apparatus of claim 1, wherein the sending the chat data to the client device includes:
   sending chat data associated with each previous chat session of the subset of the plurality of previous chat sessions one at a time to the client device for review by the user in accordance with an automated chat session; and
   terminating the automated chat session in response to a user indication by the user that the chat request has been satisfied.

8. The apparatus of claim 1, wherein the client device is a mobile communication device and wherein the chat request is entered via user speech.

9. A method comprising:
   storing, by a processor, chat data for each of a plurality of previous chat sessions in a chat database;

receiving, by the processor, a chat request from a client device associated with a user;

identifying, by searching the chat database via the processor, a subset of the plurality of previous chat sessions that corresponds to the chat request, wherein the subset of the plurality of previous chat sessions corresponding to the chat request is associated with other users, wherein the identifying the subset of the plurality of previous chat sessions corresponding to the chat request includes determining a confidence that the subset of the plurality of previous chat sessions corresponds to the chat request exceeds a confidence threshold;

when the subset of the plurality of previous chat sessions includes at least a predetermined number of previous chat sessions that are associated with the other users:

determining, by the processor, a ranking of the subset of the plurality of previous chat sessions based on the confidence determined for each of the subset of the plurality of previous chat sessions;

selecting, by the processor, exactly the predetermined number of highest ranked previous chat sessions from the subset of the plurality of previous chat sessions in accordance with the ranking;

retrieving, by the processor, chat data corresponding to the exactly the predetermined number of highest ranked previous chat sessions from the chat database; and sending, by the processor, the chat data corresponding to the exactly the predetermined number of highest ranked previous chat sessions to the client device; and when less than the predetermined number of previous chat sessions corresponding to the chat request are identified in the subset of the plurality of previous chat sessions:

establishing, by the processor, a chat session between the user and a live agent when less than the predetermined number of previous chat sessions corresponding to the chat request are identified in the subset of the plurality of previous chat sessions.

10. The method of 9, wherein a media format of the chat session between the user and the live agent is controlled via an agent terminal associated with the live agent, further comprising:

facilitating operation of the chat session between the user and the live agent via a first media; and escalating the chat session between the user and the live agent to operate via a second media, wherein the first media includes text, and wherein the second media includes voice and video.

11. The method of claim 9, wherein the determining the ranking of the subset of the plurality of previous chat sessions is further based on at least one of: demographics of the user, or a geographic location of the client device.

12. The method of claim 9, wherein the chat data of each of the plurality of previous chat sessions in the chat database includes text corresponding to each of the plurality of previous chat sessions, wherein the searching includes identifying at least one word associated with the chat request and text mining the chat data of the plurality of previous chat sessions in the chat database based on the at least one word, and wherein the identifying the subset of the plurality of previous chat sessions corresponding to the chat request includes evaluating at least one term frequency and inverse document frequency associated with the at least one word and the subset of the plurality of previous chat sessions.

13. The method of claim 9, wherein the chat data includes text collected in a corresponding one of the subset of the plurality of previous chat sessions.

14. The method of claim 9, further comprising:

collecting chat data associated with the chat session between the user and the live agent;

anonymizing the chat data associated with the chat session;

cleaning the chat data associated with the chat session to improve readability and to remove inappropriate content, wherein the chat data associated with the chat session after the anonymizing and the cleaning is added to the chat database; and retrieving the chat data corresponding to the chat session between the user and the live agent and sending the chat data corresponding to the chat session to another client device for review by a subsequent user based on another chat request received from the another client device associated with the subsequent user.

15. The method of claim 9, wherein the sending the chat data to the client device includes:

sending chat data associated with each previous chat session of the subset of the plurality of previous chat sessions one at a time to the client device for review by the user in accordance with an automated chat session; and terminating the automated chat session in response to a user indication by the user that the chat request has been satisfied.

16. The method of claim 9, wherein the client device is a mobile communication device and wherein the chat request is entered via user speech.

17. A non-transitory computer-readable medium storing instructions which, when executed by a processor, cause the processor to perform operations, the operations comprising:

storing chat data for each of a plurality of previous chat sessions in a chat database;

receiving a chat request from a client device associated with a user;

identifying, by searching the chat database, a subset of the plurality of previous chat sessions that corresponds to the chat request, wherein the subset of the plurality of previous chat sessions corresponding to the chat request is associated with other users, wherein the identifying the subset of the plurality of previous chat sessions corresponding to the chat request includes determining a confidence that the subset of the plurality of previous chat sessions corresponds to the chat request exceeds a confidence threshold;

when the subset of the plurality of previous chat sessions includes at least a predetermined number of previous chat sessions that are associated with the other users:

determining a ranking of the subset of the plurality of previous chat sessions based on the confidence determined for each of the subset of the plurality of previous chat sessions;

selecting exactly the predetermined number of highest ranked previous chat sessions from the subset of the plurality of previous chat sessions in accordance with the ranking;

retrieving chat data corresponding to the exactly the predetermined number of highest ranked previous chat sessions from the chat database; and sending the chat data corresponding to the exactly the predetermined number of highest ranked previous chat sessions to the client device; and when less than the predetermined number of previous chat sessions corresponding to the chat request are identified in the subset of the plurality of previous chat sessions:
establishing a chat session between the user and a live agent when less than the predetermined number of previous chat sessions corresponding to the chat request are identified in the subset of the plurality of previous chat sessions.

18. The non-transitory computer-readable medium of 17, wherein a media format of the chat session between the user and the live agent is controlled via an agent terminal associated with the live agent, the operations further comprising:
facilitating operation of the chat session between the user and the live agent via a first media; and
escalating the chat session between the user and the live agent to operate via a second media, wherein the first media includes text, and wherein the second media includes voice and video.

19. The non-transitory computer-readable medium of claim 17, wherein the determining the ranking of the subset of the plurality of previous chat sessions is further based on at least one of: demographics of the user, or a geographic location of the client device.

20. The non-transitory computer-readable medium of claim 17, wherein the chat data of each of the plurality of previous chat sessions in the chat database includes text corresponding to each of the plurality of previous chat sessions, wherein the searching includes identifying at least one word associated with the chat request and text mining the chat data of the plurality of previous chat sessions in the chat database based on the at least one word, and wherein the identifying the subset of the plurality of previous chat sessions corresponding to the chat request includes evaluating at least one term frequency and inverse document frequency associated with the at least one word and the subset of the plurality of previous chat sessions.

* * * * *